June 15, 1943. H. E. ANTHONY 2,321,642
VENDING MACHINE
Filed Aug. 2, 1941 3 Sheets-Sheet 1
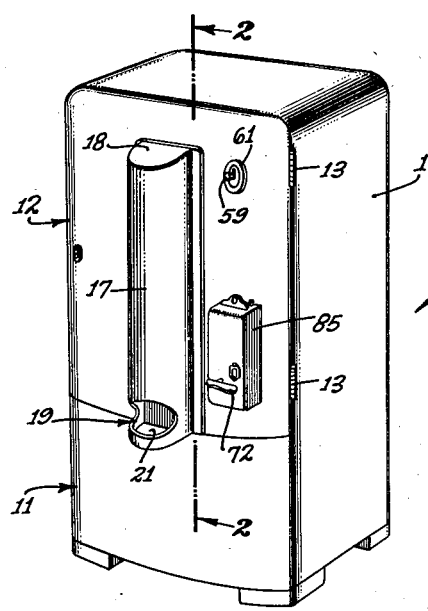
Fig. 1.
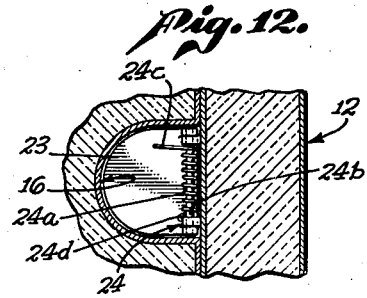
Fig. 12.
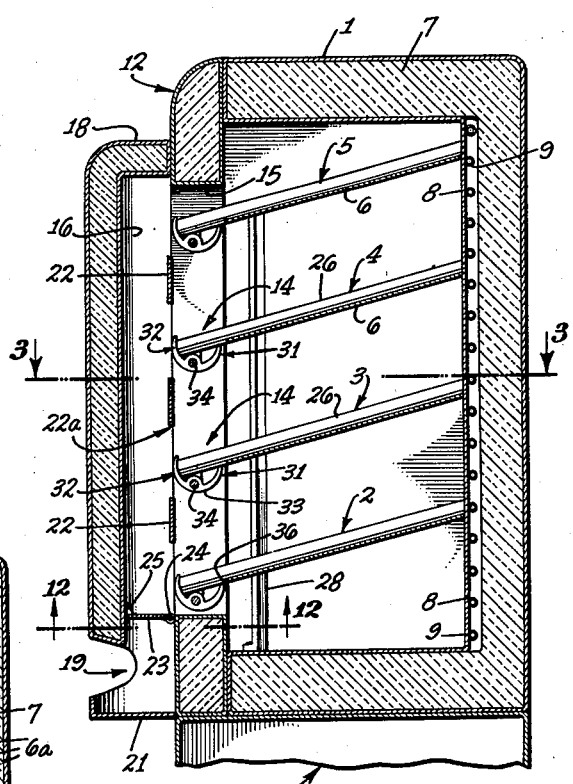
Fig. 2.
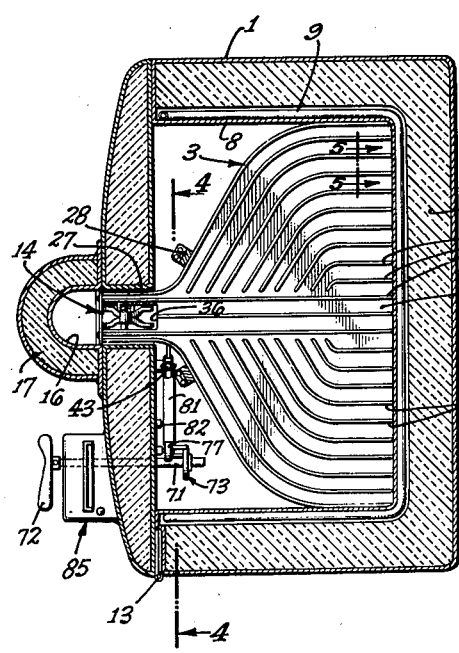
Fig. 5.
Fig. 3.
HOWARD E. ANTHONY,
INVENTOR
BY
ATTORNEY.

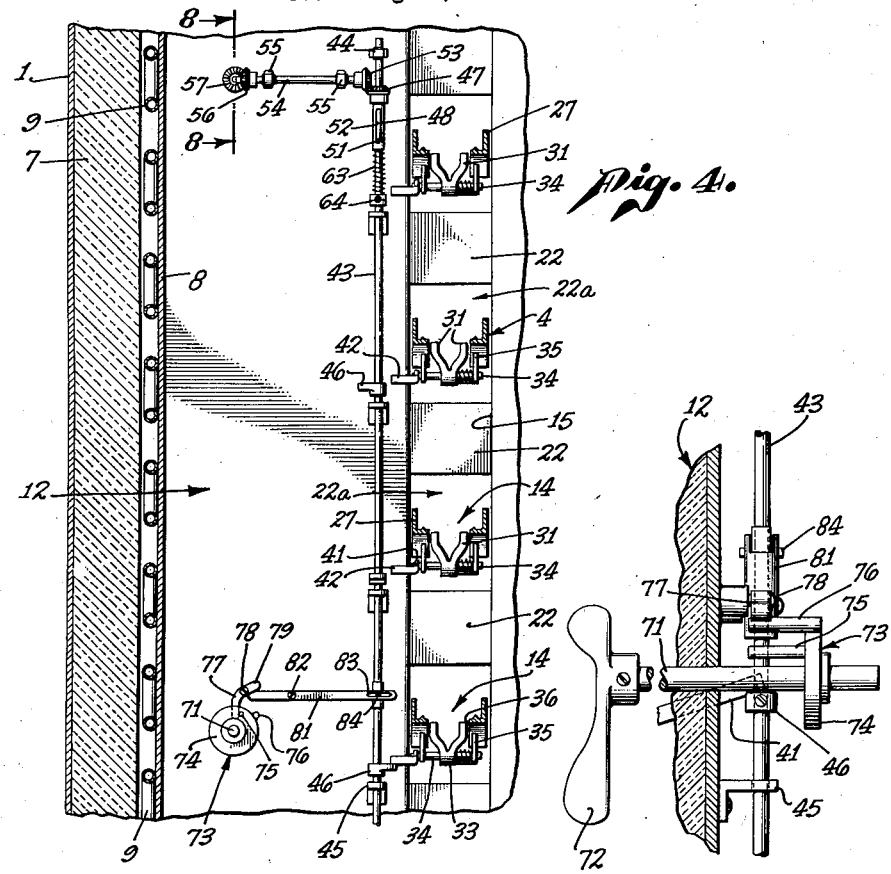
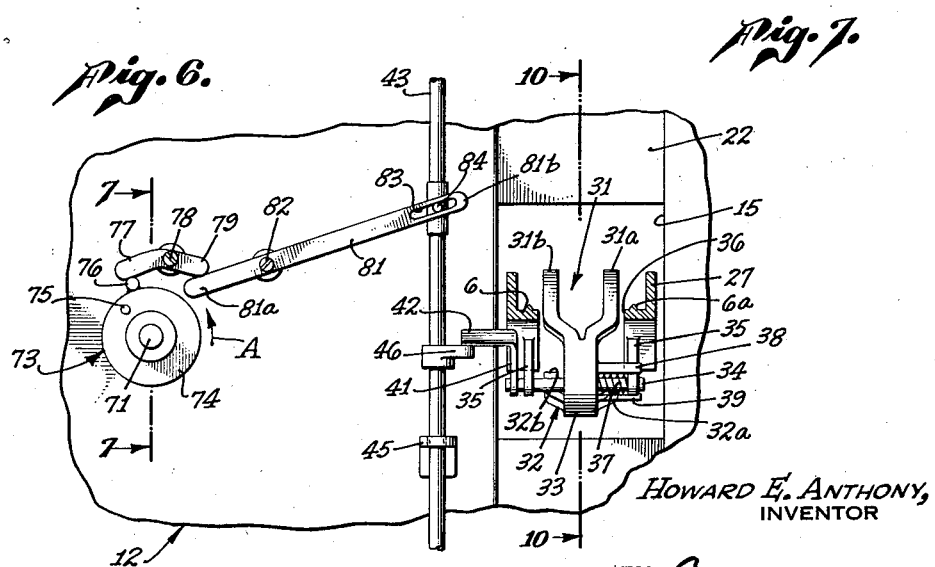

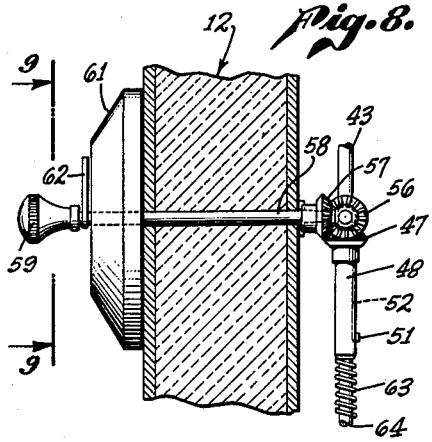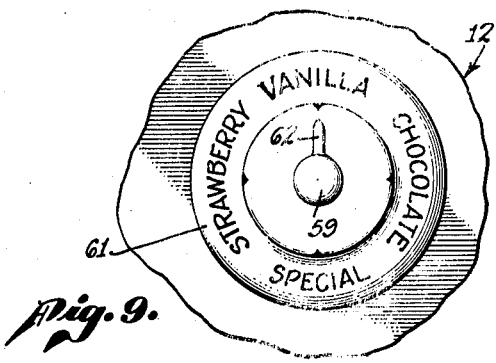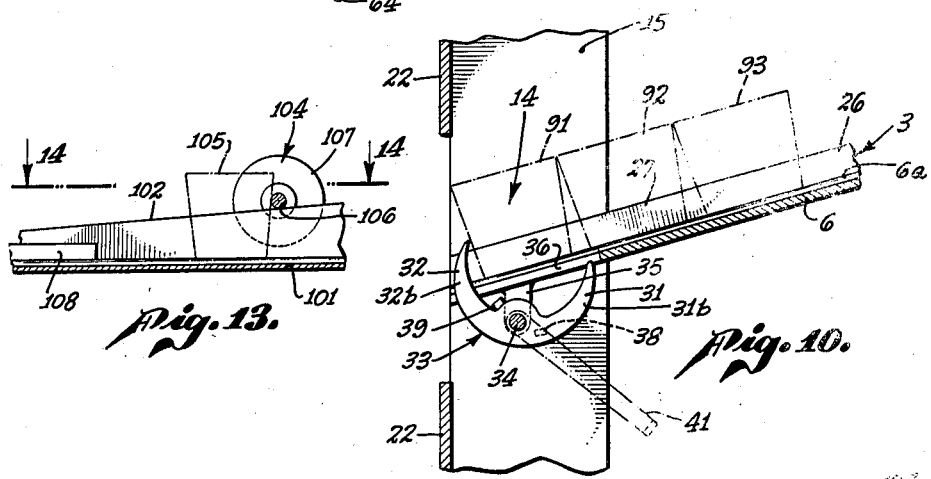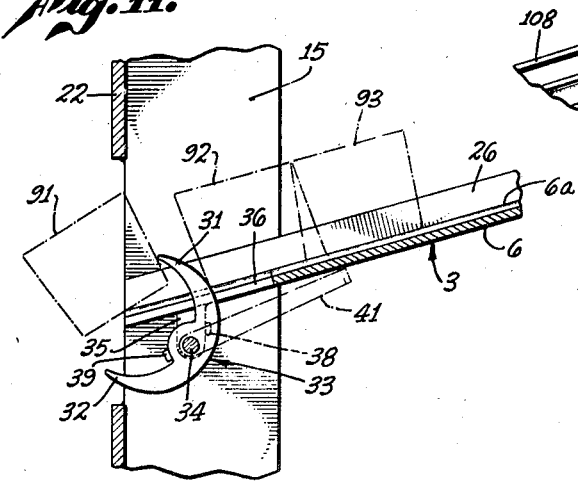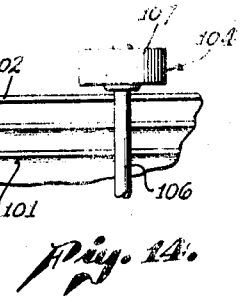

Patented June 15, 1943

2,321,642

UNITED STATES PATENT OFFICE 2,321,642

VENDING MACHINE

Howard E. Anthony, Los Angeles, Calif.

Application August 2, 1941, Serial No. 405,205

7 Claims. (Cl. 312—44)

This invention relates to vending apparatus and pertains more particularly to an apparatus for vending articles such as cups of ice cream or the like.

An important object of this invention is to provide a simple vending apparatus having a relatively high storage capacity for cups of ice cream or the like.

Another object of the invention is to provide an apparatus for selectively vending cups of differently flavored ice cream or the like.

Another important object of the invention is to provide vending apparatus in which articles such as cups of ice cream are moved to a position of discharge and are delivered by the action of gravity.

Another and more specific object of the invention is to provide an apparatus which may be readily incorporated in standard refrigerators so that cups of differently flavored ice cream may be selectively vended.

A further object of the invention is to provide a novel apparatus for selectively discharging articles to be vended from a plurality of vertically spaced delivery means.

Another object of the invention is to provide a novel apparatus for delivering articles one at a time from a storage space.

Further objects and advantages of the invention will either be specifically brought out in the ensuing description or will be apparent therefrom.

My invention will be better understood when described in connection with the accompanying drawings, in which:

Fig. 1 is a perspective elevation of a complete apparatus according to my invention;

Fig. 2 is a vertical cross-section taken substantially along line 2—2 in Fig. 1;

Fig. 3 is a horizontal cross-section taken substantially along line 3—3 in Fig. 2;

Fig. 4 is a partly broken-away vertical section taken substantially along line 4—4 in Fig. 3;

Fig. 5 is a broken-away sectional detail of one of the storage and delivery racks taken along line 5—5 in Fig. 3;

Fig. 6 is an enlarged view of the lower portion of Fig. 4;

Fig. 7 is a view of the operating mechanism taken along line 7—7 in Fig. 6;

Fig. 8 is a view of the selecting mechanism taken along line 8—8 in Fig. 4;

Fig. 9 is an elevational view of the selector dial taken along line 9—9 in Fig. 8;

Fig. 10 is an enlarged sectional elevation of the delivery mechanism taken along line 10—10 in Fig. 6;

Fig. 11 is a view taken at the same position as Fig. 10 illustrating the action of the discharge mechanism when discharging a cup from a storage rack, corresponding to the position illustrated in Fig. 6;

Fig. 12 is an inverted plan view of the trap door at the bottom of the delivery chute shown in Fig. 2, as taken on line 12—12 therein;

Fig. 13 is a partly sectional view of a variational form of storage rack construction useful according to my invention; and Fig. 14 is a partial plan view thereof taken along line 14—14 in Fig. 13.

Referring to Figs. 1-12 of the drawings and particularly Figs. 1-3 thereof, my apparatus is shown as comprising a casing 1 within which is mounted a plurality of vertically spaced delivery means 2, 3, 4, and 5. Each of the delivery means is shown as comprising a relatively flat rack or shelf 6 adapted to receive and store a relatively large number of articles such as cups of ice cream or the like. Since the invention is described in connection with the vending of ice cream, the casing 1 is shown provided with relatively thick insulated walls 7 and with suitable means for refrigerating the interior of the casing. For example, the outside of inner lining 8 of the casing may be provided with refrigerating coils 9 suitably connected to refrigerating apparatus not shown but which may be located in lower portion 11 of the casing.

The racks 6 are shown located in vertically spaced parallel planes intersecting the rear wall of the casing in horizontal lines and sloping downward toward one side wall of the casing. In this particular instance the racks slope toward door 12 of the casing which is hinged to the remainder of the casing at 13 about a vertical axis and forms the front side wall of the casing.

Each of the racks 6 is adapted to store a plurality of cups and to deliver them toward one side wall of the casing to a position of discharge. Thus the racks deliver cups through the action of gravity toward the door 12 to a position of discharge indicated at 14 located within a vertically extending slot 15 provided in the door. Cups are discharged from the position 14 into a common downward extending discharge passage 16 defined by a semi-cylindrical structure 17 secured to the outside of the door. The upper end of the passage 16 is closed as at 18 and the lower end is provided with a delivery opening 19 from which cups may be withdrawn after delivery down the passage 16. A suitable shelf is provided at 21 below the opening 19 to arrest cups discharged through the delivery passage 16.

In order to reduce circulation and heat loss and also to increase the effectiveness of the delivery passage or chute, the back wall thereof is provided with a plurality of vertically and transversely extending baffles or partitions 22 spaced vertically to define vertically extending openings 22a through which the cups may be discharged from the discharge position 14 into the passage 16. For the same reason I have provided a spring-operated trap door 23 in the chute 16 below the lowermost rack 6 and above the delivery opening 19. The trap door is shown pivotally mounted as at 24 to the lower edge of the walls defining the slot 15 and is suitably spring-biased upwardly to close the lower end of the delivery chute, a suitable stop being provided as at 25 in the chute to limit upward movement of the trap door.

The door is adapted to swing downward under the influence of the weight of a cup to permit passage thereof past the door. The trap door is illustrated in greater detail in Fig. 12 and the biasing means is shown as comprising a coil spring 24a wrapped around pivot pin 24b forming part of the hinge structure 24. The ends of the spring indicated at 24c and 24d respectively engage the under part of the trap door and a fixed portion of the door 12, whereby the door is biased to its closed position by the torsional forces imparted by the spring. The trap door also acts as a baffle to provide protection against tampering with the machine to secure unauthorized delivery of cups. It will be appreciated that a plurality of trap doors of the general character set forth, may be provided, as by extending the passage 16 downward a greater distance, so that a more effective heat seal and protecting baffle structure is obtained.

Each of the racks 6 is provided with side rails 26 to hold the cups thereon and the racks are provided adjacent the discharge position 14 with inwardly directed guide means 27 for guiding the cups one at a time to the position of discharge. In this particular case the guide means 27 comprises a continuation of the side rails 26, which continuation side rails are spaced from one another by a distance which is less than twice the base diameter of a cup and somewhat greater than the base diameter of a single cup at the position of engagement of the side rail with a cup.

In order to prevent the cups from sticking to the shelves or racks, suitable means is provided for limiting the area of contact between the cups and the rack. For example, each of the racks may be provided with corrugations or ribs pressed upwardly from the surface thereof as indicated at 6a in Figs. 3 and 5 and extending in a direction toward the discharge position 14 whereby cups tend to travel longitudinally along the corrugations, the distance between corrugations being less than the base diameter of the cups. Obviously, the shelves or racks need not be formed from a plate but may be formed from wire in which case the wires may be shaped to follow the plan of the corrugations.

The racks may be suitably secured to the interior of the casing. For example, they may be secured at their outer or upper ends to inner wall 8 and at a position adjacent their inner ends to columns 28 carried on the bottom wall of the interior of the casing.

Suitable means is provided adjacent the discharge position 14 of each of the racks for discharging cups one at a time therefrom. The discharge means is shown in Figs. 2, 3, 4, 6, 10, and 11. Although the discharge means needs not be mounted on the racks and may be mounted independently thereof as on the door or otherwise supported in operative relation to the racks, I prefer to mount them on the racks. Each of the discharge means may comprise a pair of fingers 31 and 32. In the example illustrated each of the fingers is split to form pairs of fingers 31a and 31b, and 32a and 32b, respectively.

The fingers 32 act as a check to prevent discharge of a cup to be delivered until the operating mechanism is actuated. The fingers 31 perform the dual function of limiting the discharge to one cup at a time and also of forcibly discharging the cup to be delivered when the operating mechanism is actuated should such forcible discharge be required.

In the example illustrated, the fingers 31 and 32 are secured together to form a generally crescent-shaped member 33 when viewed from side elevation. The central portion of the crescent-shaped member 33 is secured to a horizontally extending operating shaft 34 journaled in supports 35 depending from the racks 6 adjacent their respective discharge positions. The racks are suitably cut away as at 36 so that the finger 31 may travel from a position below the rack to a position above the rack.

The members 33 are biased to a position as indicated in Figs. 2 and 10 in which the finger 32 is uppermost and the finger 31 is in a position below the level of the cups. The biasing means, best seen in Figs. 4 and 6, is shown as comprising a torsion spring 37 wrapped around the shaft 34 and secured at one end to a support 35 and at its other end to the member 33. Suitable stop means, best seen in Figs. 6 and 10, is provided for limiting the movement of the member 34. Such stop means may comprise projections 38 and 39 carried on the crescent-shaped member 33 at opposite sides of one of the supports 35 which they engage at the limits of their movement.

Each of the discharge means is provided with an operating lever 41 secured to the shaft 34 and extending rearward within the slot 15 past the inner wall of the door 12 toward the rear wall of the casing. The rear or outer ends of the levers are each provided with a lateral projection 42 extending horizontally and generally parallel to the plane of the inner face of the door. The projections 42 are in general perpendicular alinement and are spaced from a vertically extending shaft 43 which is mounted for sliding and rotary movement on vertically spaced bearings 44 and 45 carried on the inner face of the door. The shaft 43 is provided with a plurality of vertically and angularly spaced projections 46 each adapted, upon proper rotative positioning thereof and upon upward sliding movement of the shaft 43, to engage the end 42 of an operating lever and to move the end of the operating lever upward to rotate an operating shaft 34.

Suitable means operable from the outside of the casing is provided for rotating the shaft 43 to each of a plurality of selected positions. Such means may comprise a bevel gear 47 carried on a sleeve 48 slidably mounted on the shaft 43 as may be seen in Figs. 4 and 8. The sleeve 48 is constrained to rotate with the shaft 43 through the agency of a pin 51 secured to the shaft and extending through a longitudinally extending slot 52 in the sleeve. The bevel gear 47 meshes with another bevel gear 53 which is secured to one end of a shaft 54 journaled in supports 55 carried on the inner wall of the door. The other end of the shaft 54 is provided with a bevel gear 56 which meshes with a bevel gear 57 secured to the inner end of a selector shaft 58 which extends through the door and is provided with an operating handle 59 at its outer end. The shaft 58 is shown extending through a suitable dial plate 61 having indicia whereby the desired article may be selected by turning the knob 59 and shaft 58. The shaft 58 is provided with pointer 62 cooperating with the dial. The bevel gear 47 is biased into engagement with the gear 53 through the agency of a compression spring 63 wrapped around the shaft 43, one end of the spring engaging the lower end of the sleeve 48 and the other end of the spring engaging a collar 64 suitably secured to the shaft 43.

It will be noted that the apparatus is provided with four spaced racks 6 and each rack may contain ice cream of one of the flavors indicated by the dial. By turning the pointer to any of the four selected positions on the dial, delivery of ice cream from the corresponding rack may be effected. The angular spacing between the projections 46 is such that for each selected position of the pointer and the corresponding selected position of the shaft 43, only one, depending upon the flavor selected, of the projections is in position to engage the end of its associated operating lever. Thus when the shaft 43 is in any one of its four selected positions only the selected one of the four projections will engage and move the outer end of its associated operating lever upon upward movement of the shaft 43.

Suitable operating means operated from the outside of the casing is provided for producing sliding movement of the shaft 43. The operating means is shown in detail in Figs. 4, 6, and 7 and may comprise a shaft 71 extending through the casing and provided at its outer end with an operating handle 72 and at its inner end with cam means 73 comprising a circular plate 74 secured to the shaft 71 and provided with a pair of laterally projecting angularly and radially spaced dogs 75 and 76. When the shaft 71 is rotated in the direction of the arrow A (Fig. 6), the dogs successively contact the under side of one end of a lever 77, which is pivotally mounted as at 78 intermediate its ends to the inner face of the door, to cause downward movement of the opposite end of said lever which engages the adjacent end 81a of a lever 81 and moves said end downward. The lever 81 is pivotally mounted to the inner face of the door intermediate its ends as at 82 and is provided at its outer end 81b with a slot 83 with which it makes sliding connection with a pin 84 carried on the shaft 43.

A suitable coin-operated lock is indicated at 85 in Figs. 1 and 3 for preventing unauthorized rotation of the shaft 71. Since numerous coin-operated locks are commercially available, it is not believed necessary to describe the lock. Thus the shaft 71 is shown extending directly through the locking mechanism in order to illustrate the operation of my apparatus.

With the particular apparatus illustrated it may be assumed that the restrictions imposed by the coin lock require a 90° rotation of the shaft 71 for each delivery from the machine. The starting position of the cam means 73 is indicated in Fig. 4. The rotative position of the shaft and cam means for maximum upward movement of the shaft 43 is indicated in Fig. 6. As the shaft 71 is rotated backward from this position the shaft 43 is biased to its starting position indicated in Fig. 4 through the action of the spring 63 and gravity.

In Figs. 10 and 11 the operation of the delivery means is illustrated in detail. A plurality of cups indicated in dot-dash lines at 91, 92, and 93 are shown positioned on the shelf 6 with each cup contacting the other and forcing it through the action of gravity to slide over the shelf toward the delivery position 14. The lowermost cup 91 is positioned between the guiding rails 27 at the position of discharge 14 and is prevented from leaving the end of the shelf by the fingers 32 which engage the adjacent forward end of the cup 91 at a position above the plane of the shelf. The fingers 32 are in the position indicated in Fig. 10 when the operating mechanism is in the position indicated in Fig. 4, this being the normal position for each of said fingers before the delivery operation is begun.

Rotation of the shaft 71 in the direction of the arrow A from the position indicated in Fig. 4 produces upward movement of the shaft 43 and downward movement of the fingers 32 upon counterclockwise rotation of the shaft 43 by the lever 41. Before the fingers 32 terminate the engagement with the cup 91 and pass below the plane of the corrugations 6a, the fingers 31 rise above the plane of the corrugations and are positioned to engage the adjacent forward edge of the next succeeding cup 92, thereby preventing movement of the cup 92 to the discharge position 14. Further movement of the shaft 71 results in movement of the fingers 32 to a position below the plane of corrugations 6a, to permit the discharge of the cup 91 from the lower end of the rack 6. The limiting position of the fingers 31 and 32, corresponding to the rotative position of the shaft 71 shown in Fig. 6, is indicated in Fig. 11.

It will be noted that the fingers 31 move to a position to engage the rearward edge of the cup 91 and forcibly discharge the cup from the end of the rack 6. In some cases the cup will discharge by gravity from the end of the shelf without being impelled by the fingers 31. However, the greatest tendency for ice to form is at the discharge position in view of the possible ingress of air from the delivery chute. Thus for safety's sake the fingers 31 are so formed as to be capable of forcibly expelling the cup. Upon the return of the fingers to the positions indicated in Fig. 10, the next cup 92 slides past the lowered fingers 31 and is checked by the raised fingers 32. It will be noted that the fingers will return rapidly to the positions indicated in Fig. 10 after the shaft 77 is rotated clockwise as viewed in Fig. 6. It will be noted that major movement of the levers 77 and 81 occurs in the small portion of the angular movement of the shaft 71 while the dog 76 engages lever 77. The remaining small movement of the levers 77 and 81 occurs during the major portion of the angular movement of the shaft 71 while the lever 77 engages the dog 75. Hence, there is no danger of a cup being discharged before the fingers 32 return to their checking position.

In the preceding description it has been assumed that the cups will slide down the racks toward the discharge position under the influence of gravity without any auxiliary means for moving them. For that reason the shelves are sloped toward the discharge position at a sufficient angle to cause such movement. It should be appreciated that it is not necessary to provide sloping shelves and that horizontally extending shelves may be employed as indicated at 101 in Figs. 13 and 14. In this example side rails having upper surfaces sloping toward the discharge position may be provided as indicated at 102. Suitable roll means indicated at 104 may be supported on the guide rails 102 for forcing cups toward the discharge position. The position of the cup is indicated in dot-dash lines at 105. The roll means may comprise an axle 106 adapted to roll along the guide rails 102 in contact with the cups and is provided at its outer ends with heavy wheels 107 to give the desired gravity force. With such an arrangement it is preferable that the guide rails 102 extend parallel to one another for the full length of travel of the roll means. Thus it is necessary to provide other rail means for guiding the cups to the position of discharge, although the rail means 102 may be used for holding the cups in position for part of their travel. The additional rail means for guiding the cups to the position of discharge is indicated at 108. Obviously, the above described expedient or a similar expedient for forcing the cups to a position of discharge by means of roll means may be employed with sloping shelves such as previously described.

Although I have described my invention in connection with the vending of cups of ice cream, the cups being formed from cardboard or the like, it should be obvious that my invention may be used with other articles of the same general shape and characteristics. For example, any article adapted to slide over a rack while maintaining an upright position and having a generally cylindrical or polygonal shape such as hexagonal or octagonal shape may be vended, the only other limitation being the ability of the article or the package therefor to withstand the shock of delivery through a downward extending delivery chute such as described.

Obviously, my invention is subject to considerable modification, hence I do not choose to be limited to the forms shown and described herein, but rather to the scope of the appended claims.

I claim:

1. Apparatus for vending cups of ice cream or the like, comprising a casing; a plurality of vertically spaced cup-supporting racks located within the casing and sloping downward and forward toward one side wall of the casing for feeding cups forward in a direction toward said wall; wall means defining a downward extending delivery chute having a delivery opening at its lower end at a position below the racks; guide means adjacent the lower end of each rack for guiding the cups one at a time toward the delivery chute; delivery means for each rack pivotally mounted adjacent the delivery chute, and comprising a pair of fingers spaced from one another in the direction of cup movement, one of said fingers normally engaging a cup to prevent discharge thereof into the delivery chute, said delivery means being pivotally movable from said normal position to another position in which said one finger is out of the path of travel of a cup and the other finger engages the other side of said cup to move said cup into the delivery chute and prevents delivery of other cups from said rack into said delivery chute; and means operable from the outside of the casing for selectively operating the delivery means.

2. In apparatus for vending cups of ice cream or the like, the combination which comprises: a casing; a plurality of vertically spaced delivery means within the casing each operable to cause delivery of a cup and each having an operating lever; an elongated shaft member slidably mounted on said casing for longitudinal movement and for rotative movement to a plurality of selected positions corresponding in number to said delivery means; projection means carried by said shaft and positioned to engage a different one of said operating levers in each of said plurality of selected positions of said shaft member upon longitudinal movement of said shaft member in one direction; selecting means operated from the outside of the casing for rotating said shaft; and operating means operated from the outside of the casing and operatively associated with said shaft for slidably moving the shaft in said one direction.

3. In apparatus for vending cup of ice cream or the like, the combination which comprises: a casing; a plurality of vertically spaced delivery means within the casing each operable to cause delivery of a cup and each having an operating lever; a vertically extending shaft adapted for longitudinal sliding movement and for rotary movement to each of a plurality of selected positions; a plurality of vertically and angularly spaced projections carried by the shaft, said projections being vertically spaced so as to each engage only one operating lever, and to each engage a different operating lever, said projections being spaced angularly so that for each selected rotative position of the shaft a different one of said projections engages its associated operating lever and moves the operating lever upon sliding movement of said shaft in one direction; selecting means operated from the outside of the casing for rotating said shaft to a selected position; and operating means operated from the outside of the casing and operatively associated with said shaft for slidably moving the shaft in said one direction.

4. In an apparatus for vending cups of ice cream or the like, the combination which comprises: a casing having a door as one side wall; a plurality of vertically spaced cup delivery means located within the casing and each operable to cause delivery of a cup; a separate operating lever for each of said delivery means, said operating levers being arranged in an alined vertically spaced relation; a shaft member slidably mounted on said door at the inner face thereof for vertical and rotative movement; a plurality of vertically spaced projections mounted on said shaft member, corresponding in number and vertical spacing to said operating levers, said projections being rotatively displaced from one another, and said shaft being rotatable to a plurality of selected positions to place said projections in respective vertical alinement with said separate operating levers; means for moving said shaft member vertically to cause operative engagement of one of said levers by the respective alined projection; selecting means carried on the door and operable from the outside of the door for rotating said shaft member to any of said selected positions; and operating means carried on the door and operable from the outside thereof in operative association with said shaft member moving means, to cause vertical movement of said shaft member.

5. In apparatus for vending cups of ice cream or the like, the combination which comprises: a casing having a door defining one side wall; a plurality of vertically spaced cup delivery means located within the casing and each operable to cause delivery of a cup; a separate operating lever for each of said delivery means, said operating levers being vertically spaced from one another and being located adjacent the inner face of the door; a vertically extending shaft mounted on the inner face of the door and adapted for longitudinal sliding movement and for rotary movement to each of a plurality of selected positions; a plurality of vertically and angularly spaced projections carried by the shaft, said projections being vertically spaced so as to each engage only one operating lever, and to each engage a different operating lever, said projections being spaced angularly so that for each selected rotative position of the shaft a different one of said projections engages its associated operating lever and moves the operating lever upon sliding movement of said shaft in one direction; selecting means carried on the door and operable from the outside of the door for rotating said shaft to any of said selected positions; and operating means carried on the door for slidably moving the shaft in said one direction.

6. Apparatus as set forth in claim 5, which includes a first bevel gear mounted adjacent the inner face of the door on a horizontal axis and forming part of the selecting means; a second bevel gear meshing with the first bevel gear and slidably mounted on the shaft and constrained to rotate therewith; and means biasing the second bevel gear in a vertical direction into mesh with the first bevel gear, whereby said gears remain meshed when said shaft is moved in said one direction.

7. Apparatus as set forth in claim 5, in which said operating means includes a lever pivotally mounted intermediate its ends to the inner face of the door and having one end in operative association with said shaft; and cam means pivotally mounted on the inner face of the door in operative association with the other end of said lever.

HOWARD E. ANTHONY.